United States Patent
Freese

(10) Patent No.: US 10,486,503 B2
(45) Date of Patent: Nov. 26, 2019

(54) VEHICLE WINDOW SHADE WITH ADJUSTABLE CLIPS

(71) Applicant: Munchkin, Inc., Van Nuys, CA (US)

(72) Inventor: Lawrence O. Freese, Santa Rosa Beach, FL (US)

(73) Assignee: Munchkin Inc., Van Nuys, CA (US)

(*) Notice: Subject to any disclaimer, the term of this patent is extended or adjusted under 35 U.S.C. 154(b) by 0 days.

(21) Appl. No.: 15/061,822

(22) Filed: Mar. 4, 2016

(65) Prior Publication Data

US 2016/0257182 A1  Sep. 8, 2016

Related U.S. Application Data

(60) Provisional application No. 62/129,358, filed on Mar. 6, 2015.

(51) Int. Cl.
 B60J 1/20 (2006.01)

(52) U.S. Cl.
 CPC .......... B60J 1/2086 (2013.01); B60J 1/2063 (2013.01)

(58) Field of Classification Search
 CPC ...... B60J 1/2047; B60J 1/2038; B60J 1/2063; B60J 1/2086
 USPC ........... 160/24, 370.22, 903; 296/97.7, 97.8; 248/691, 477, 480
 See application file for complete search history.

(56) References Cited

U.S. PATENT DOCUMENTS

| | | | | |
|---|---|---|---|---|
| 1,617,981 A * | 2/1927 | Allen | ........................ | B60J 3/02 160/134 |
| 1,648,994 A * | 11/1927 | Pitman | ................... | B60J 1/2077 160/290.1 |
| 2,894,576 A * | 7/1959 | Williams | ............... | B60J 3/0208 160/181 |
| 3,584,910 A * | 6/1971 | Lupul | .................... | B60J 3/0291 160/23.1 |
| 4,179,155 A * | 12/1979 | Ortiz | ...................... | B60J 1/2063 160/DIG. 3 |
| 4,261,649 A | 4/1981 | Richard | | |
| 5,016,938 A * | 5/1991 | Tschan | ................... | B60J 3/0208 296/97.8 |
| 5,036,898 A * | 8/1991 | Chen | ...................... | B60J 1/2033 160/23.1 |
| 5,098,149 A * | 3/1992 | Lee | ......................... | B60J 1/2077 160/370.22 |
| 5,226,467 A * | 7/1993 | Lii | ......................... | B60J 1/2033 160/302 |

(Continued)

FOREIGN PATENT DOCUMENTS

CN  101537782 A  9/2009

*Primary Examiner* — Katherine W Mitchell
*Assistant Examiner* — Jeremy C Ramsey
(74) *Attorney, Agent, or Firm* — Robert Z. Evora, Esq.

(57) ABSTRACT

A vehicle window shade that is installable in a secure manner against a vehicle window. The window shade has a screen that is adapted to fit windows of varying heights. The shade comprises a base and a screen coiled and housed within the base and adapted to be extended outside of the base and retracted. At least one clip is pivotally connected to the base. The clip secures an elongated housing of the base in a substantially horizontal plane aligned with an upper or lower edge of a vehicle window. A temperature indicator may be connected to the shade and an attachment device may also be attached and adapted to secure the screen to a flat surface in an extended position.

20 Claims, 11 Drawing Sheets

(56) References Cited

U.S. PATENT DOCUMENTS

| | | | | |
|---|---|---|---|---|
| 5,356,192 | A * | 10/1994 | Schierau | B60J 3/0208 |
| | | | | 296/97.11 |
| 5,362,119 | A * | 11/1994 | Rosentratter | B60J 1/2063 |
| | | | | 160/DIG. 3 |
| 5,478,131 | A * | 12/1995 | Marks | B60J 3/0208 |
| | | | | 296/97.6 |
| 6,227,600 | B1 * | 5/2001 | Chen | B60J 1/2047 |
| | | | | 296/97.2 |
| 6,682,121 | B1 * | 1/2004 | Conforti | B60J 11/08 |
| | | | | 160/370.21 |
| 7,748,433 | B2 * | 7/2010 | Huang | B60J 1/2011 |
| | | | | 160/370.21 |
| 2005/0199357 | A1 * | 9/2005 | Dunn | B60J 1/2047 |
| | | | | 160/370.22 |

* cited by examiner

VEHICLE WINDOW SHADE WITH ADJUSTABLE CLIPS

CROSS REFERENCE TO RELATED APPLICATION

The application claims priority to U.S. Provisional Patent Application Ser. No. 62/129,358, filed Mar. 6, 2015, the contents of which are hereby incorporated by reference herein in its entirety into this disclosure.

TECHNICAL FIELD

The subject disclosure relates to the field of scrolling window shades that are attachable to a vehicle window, and in particular a vehicle window shade having clips to attach to the vehicle window.

BACKGROUND

Window shades for vehicles have been used in a variety of formats, beginning with those that are simple rectangles of a light blocking, natural or synthetic fabric. These sheets of fabric may be attached to the window by known adhesives that typically allow for the fabric to be attached, detached, and reattached at will. Window tinting is also an example of technology in window shades in that it is known that lining a vehicle window with a polymeric sheet that fits directly against the window will block certain frequencies of light from entering the vehicle. Window tinting is generally considered a permanent kind of shading for a vehicle as the tinting is very difficult to remove once applied.

Certain patents documents are in the public domain in the art of window shading. For example, Chinese Patent Publication No. 101537782A (Rongyang Steel Mould Industry Co., Ltd., Sep. 23, 2009) published in regard to listed inventor Su Yaozhang's Automotive Sun-Shading Curtain. The Yaozhang document discloses a scrolling vehicle window shade that includes a clip for attaching the top of the shade to the top of the window and further includes an attachment mechanism for attaching the base of the scrolling window shade to the vehicle door that encloses the window.

Similarly, U.S. Pat. No. 4,261,649 (Richard, Apr. 14, 1981) discloses a vehicle window shade that includes a sheet of light blocking material connected to the vehicle window by brackets that fit into the grommets holding the window in place.

These prior attempts at a convenient vehicle window shade still do not address the problem in the art of a conveniently and stably attached window shade that scrolls up and down as the window moves up and down, as in a vehicle door window. The prior art also fails to establish a scrolling window shade that can be removed easily if inserted within a vehicle door assembly.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

One or more embodiments of the subject disclosure provide for a vehicle window shade that is installable in a secure manner against a vehicle window. The window shade has a screen that is adapted to fit windows of varying heights.

The shade comprises a base and a screen coiled and housed within the base and adapted to be extended outside of the base and retracted. At least one clip is pivotally connected to the base. The clip secures an elongated housing of the base in a substantially horizontal plane aligned with an upper or lower edge of a vehicle window. A temperature indicator may be connected to the shade and an attachment device may also be attached and adapted to secure the screen to a flat surface in an extended position.

To the accomplishment of the foregoing and related ends, the subject disclosure comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

DETAILED DESCRIPTION

Figure 1:
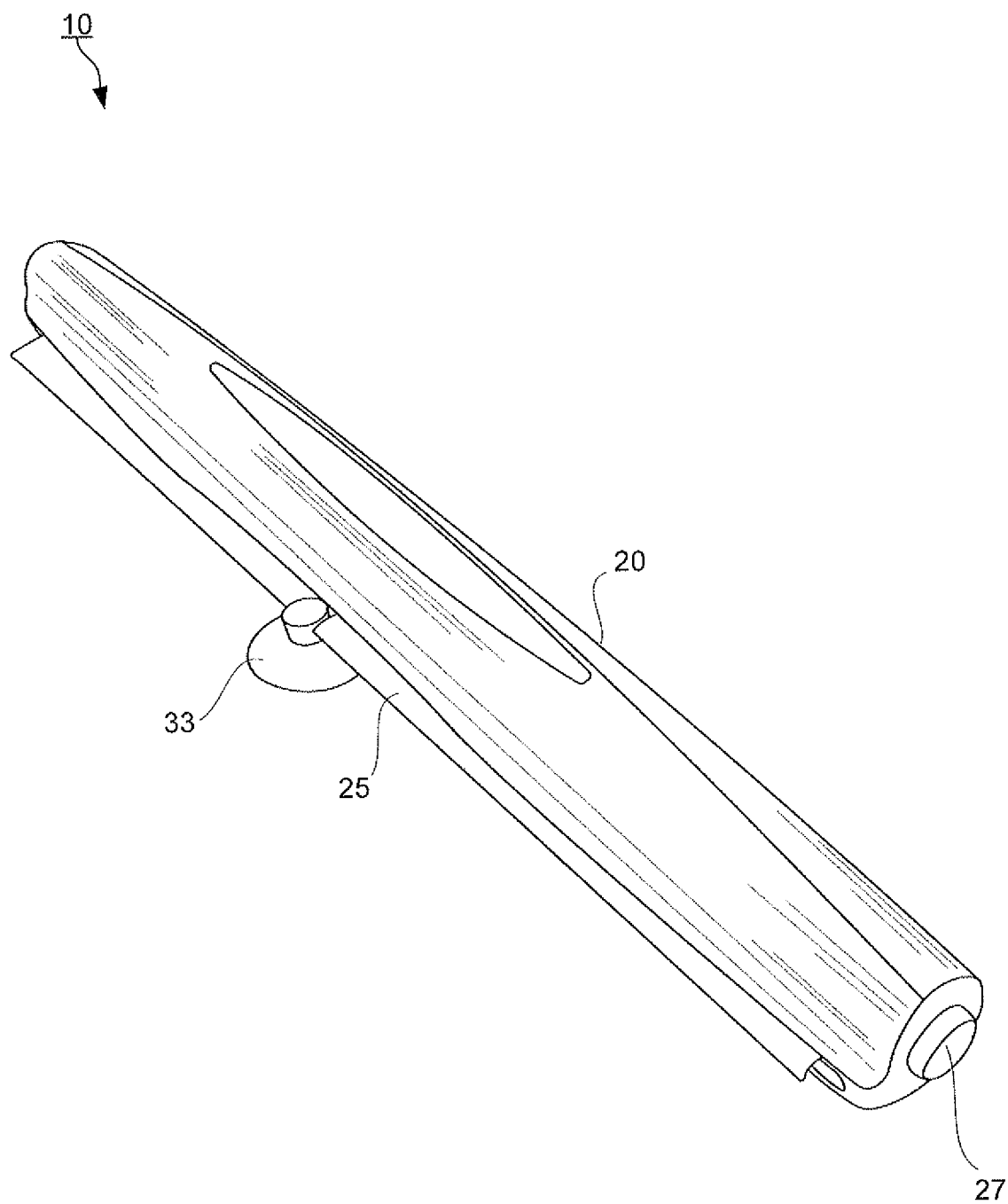
FIG. 1 is a front perspective view of a window shade as disclosed herein.

The subject disclosure is described with references to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

Figure 2:
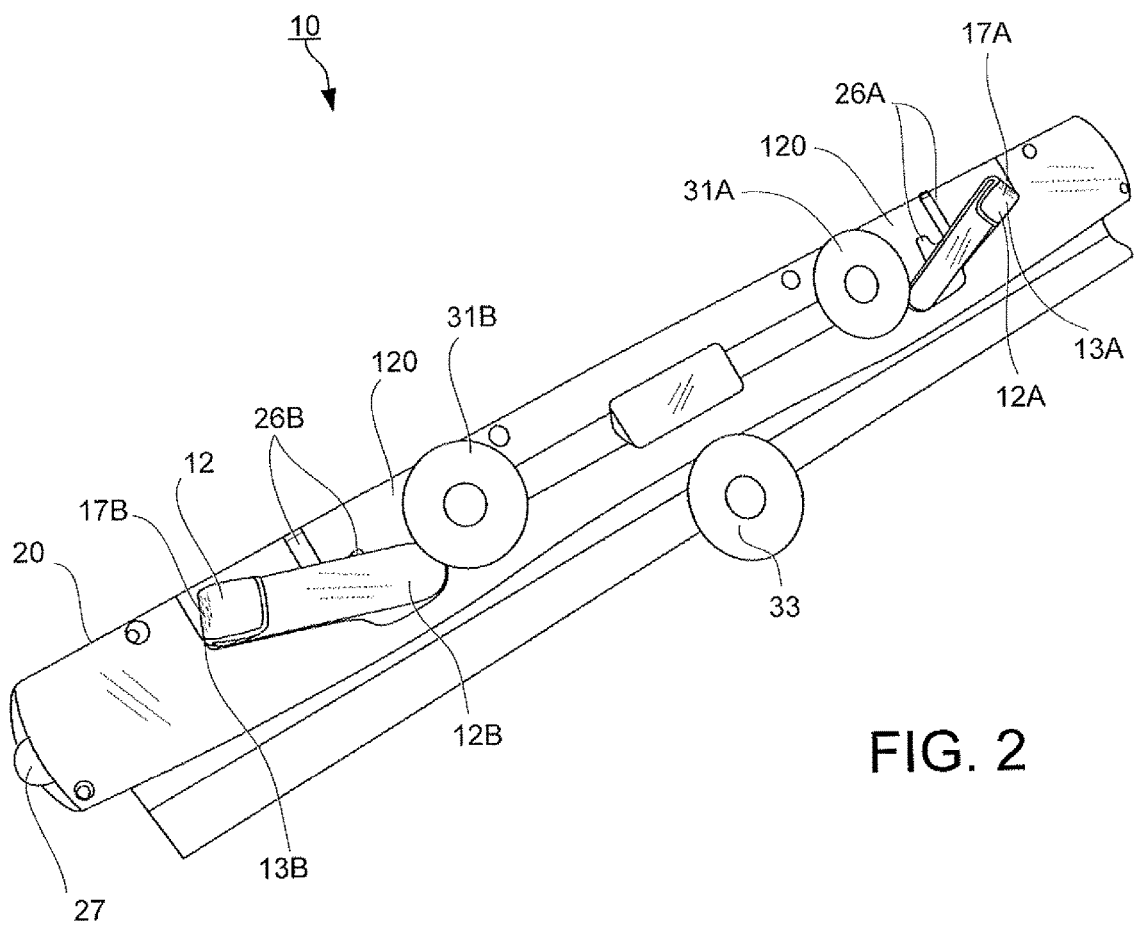
FIG. 2 is a rear perspective view of the top clips attached to the window shade of FIG. 1.
Figure 6:
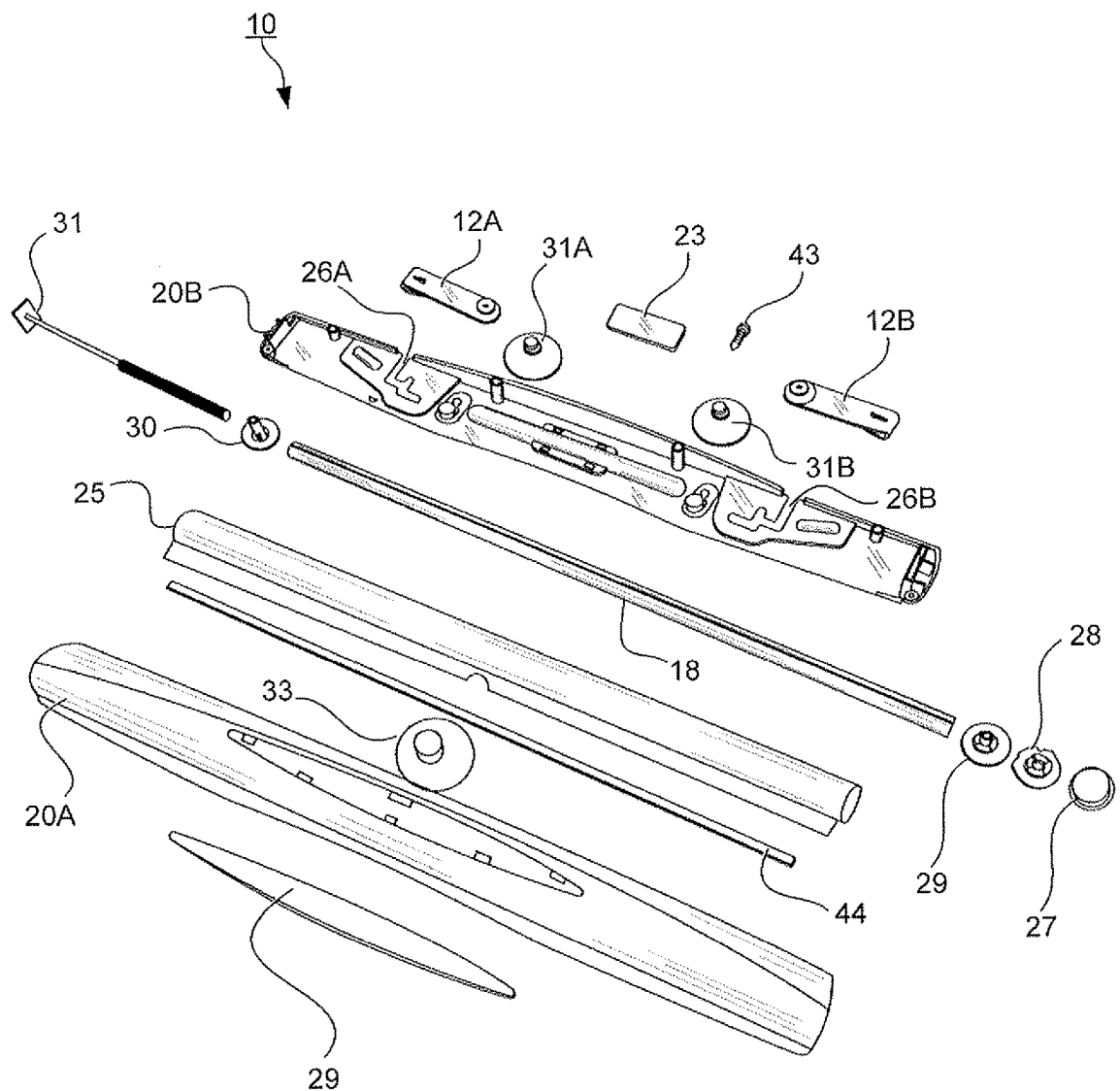
FIG. 6 is an exploded view of the window shade shown.

FIGS. 1-2 and 6 show a vehicle window shade (10) according to this detailed description includes a screen (25) that rolls up in a scrolling fashion about a reel (18) housed in a base (20). The reel (18) is biased to recoil the screen (25) into the base while simultaneously allowing for the screen

(25) to be extended outwardly to varying lengths. A least one top clip (12) is provided on the base (20) for attachment to another object.

Figure 5:
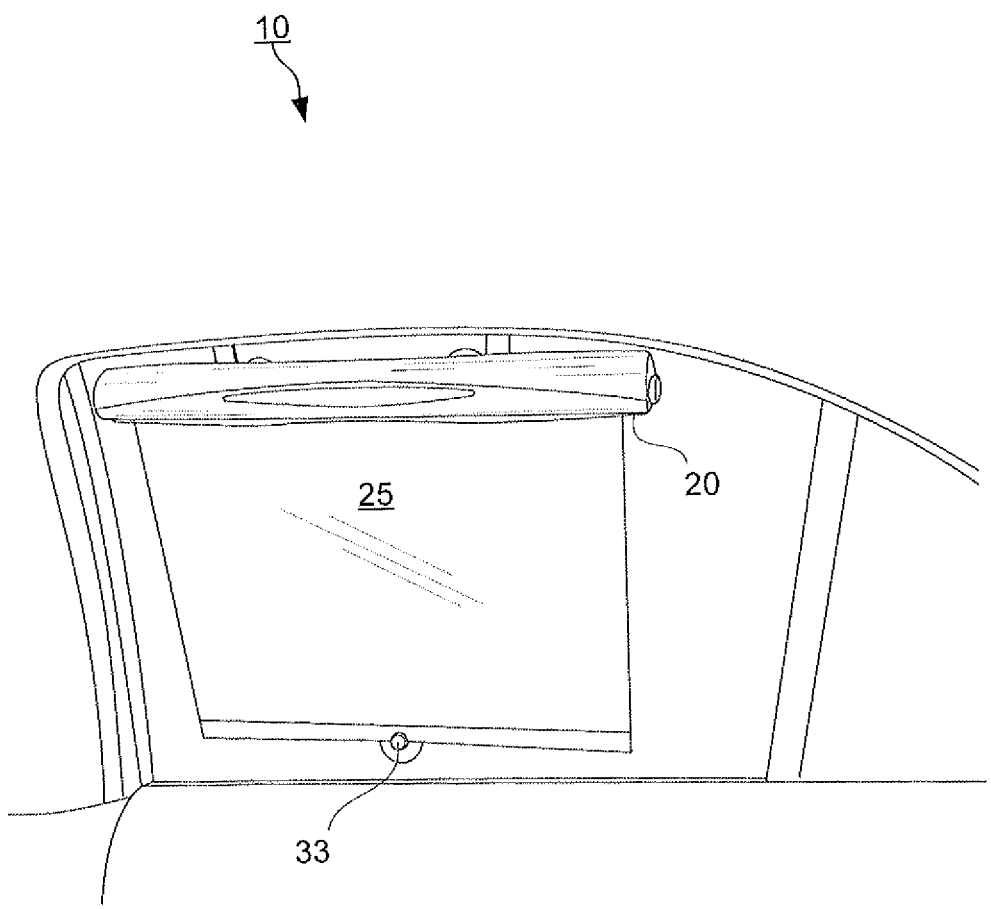
FIG. 5 is a side perspective view of the window shade of FIG. 1 in its extended state and attached to a vehicle window.

FIG. 1 shows the screen (25) recoiled entirely within the base (20) to a full extent, but positioning at intermediate extension amounts are also within the scope of this disclosure. In other words, the reel (14) housed within the base (20) of the window shade embodiment (10) allows for an outside force to pull an amount of the window shade screen (25) outwardly to any position between the full recoiled position shown in FIG. 1 and a full extension when the screen (25) is fully extended from the base (20) such as shown in FIG. 5. When the outside pulling force is removed, the screen (20) is allowed to be recoiled within the base (20) upon activation of a button (27) which activates a ratchet assembly.

Figure 3A:
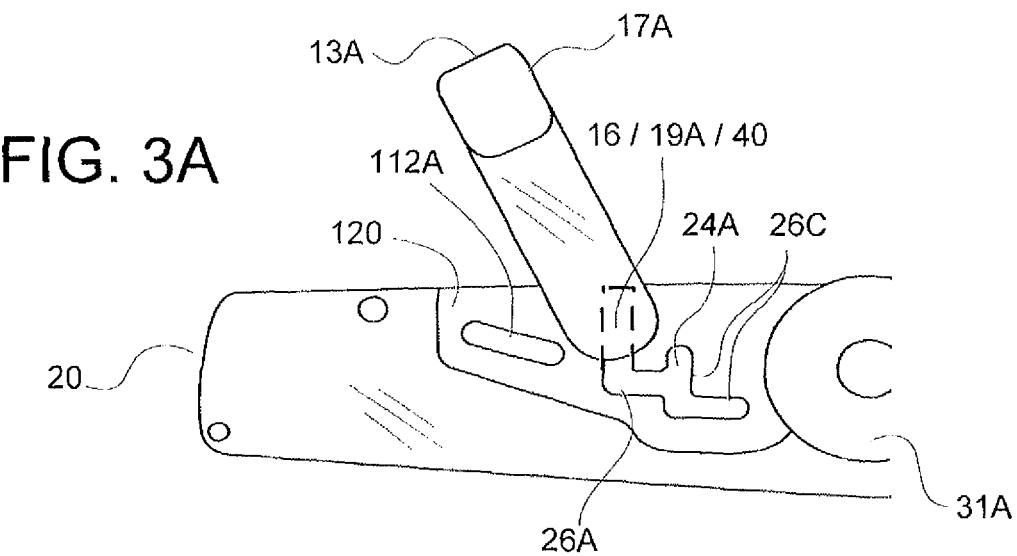
FIGS. 3A-3C are a front plan views of one embodiment of a top clip adjustably being positioned into a stair step channel for attaching the clip to the window shade of FIG. 1.
Figure 3B:
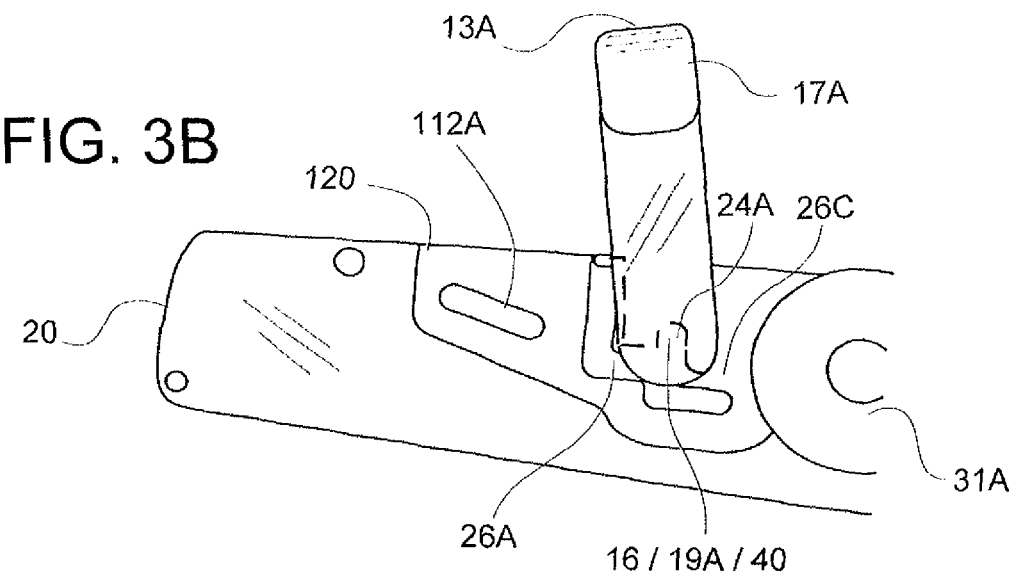
Figure 3C:
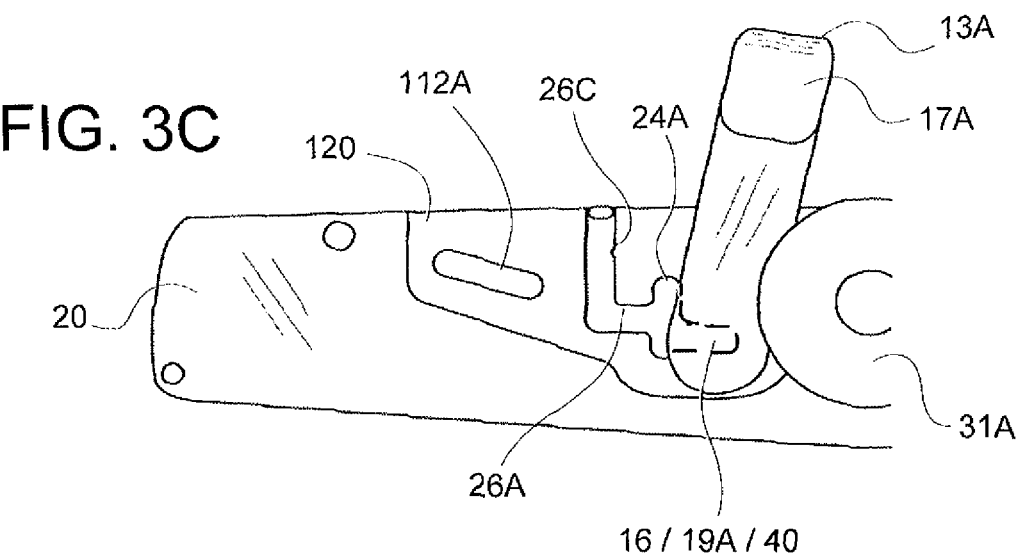

FIGS. 3A-3D depict at least one top clips (12, 12A) of the window shade (10). The top clip (12) is connected to the base (20) to secure and hold the window shade (10) and shade screen (25) in a flat horizontal plane aligned with an upper or lower edge of a vehicle window (50) such as shown in FIGS. 4A, 4B, 4C and 5. The top clip (12) can be pivotally constructed to rotate about a pivot axis (40a) disposed within the top clip (12). Projecting axles (19A, 19B) extends from the clips (12A, 12B) along the pivot axis (40a). In addition to pivoting at the pivot axis (40A, 40B), the projecting axle (19A, 19B) can also translate along and within a track (26A, 26B). The top clip (12) pivots in a first position (as shown in FIGS. 3A-3C) when in use, and pivots into a second position when not in use and in a storage position (as shown in FIG. 2).

Figure 3D:
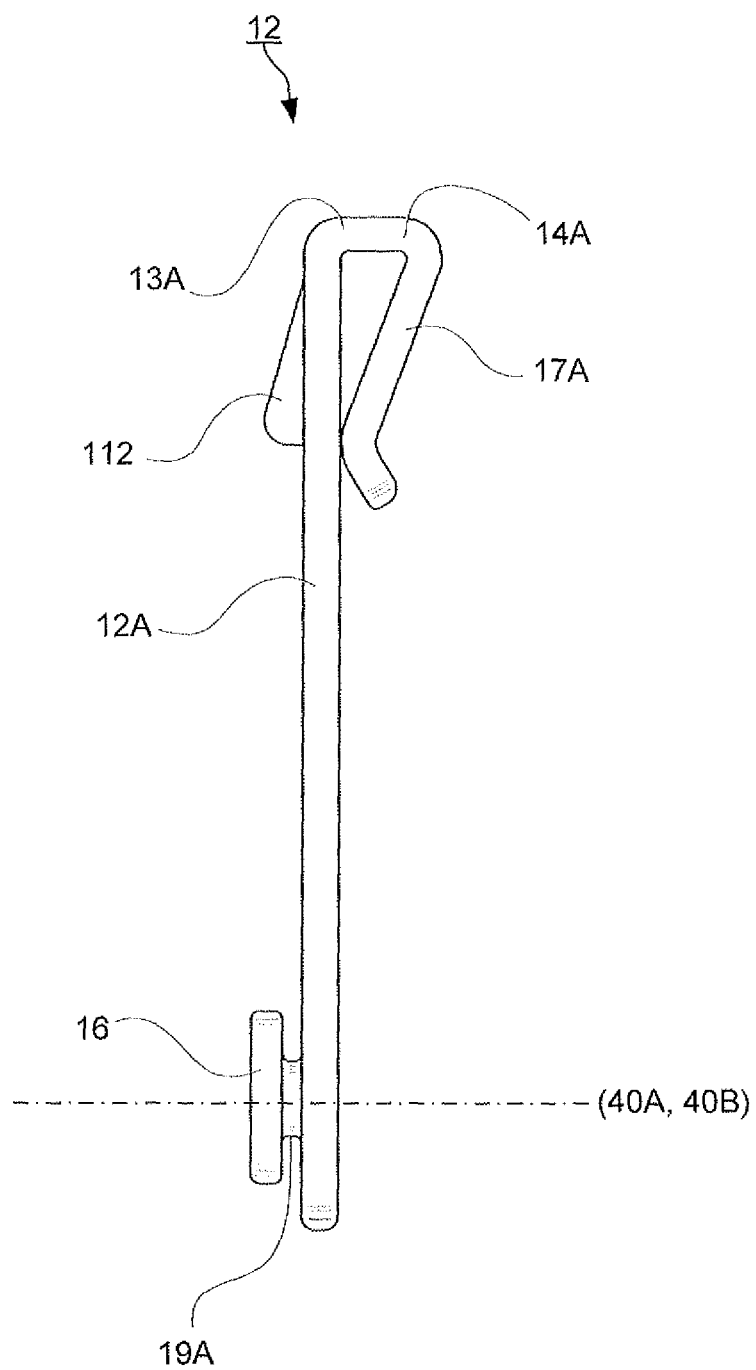
FIG. 3D is a side view of a top clip.

FIG. 3D depicts an attachment mechanism, such as a button (16) that connects the top clip (12) to a side edge (120) of the base (20). The top clips (12A, 12B) may be in the form of hooks (17A, 17B) whose hook structure is biased to remain in a closed position as shown in FIG. 2 and in a side view in FIGS. 3D and 4A. A positioning boss (112) may be provided and adapted to fit within position recess (112A) disposed on the side (120) of the base (20) as shown in FIGS. 3A-3C. In the storage position shown in FIG. 3, the clips (12A, 12B) are pivoted into an orientation that the positioning boss (112) is removably secured and positioned vie a snap fit friction fit within recess (112A).

Figure 4A:
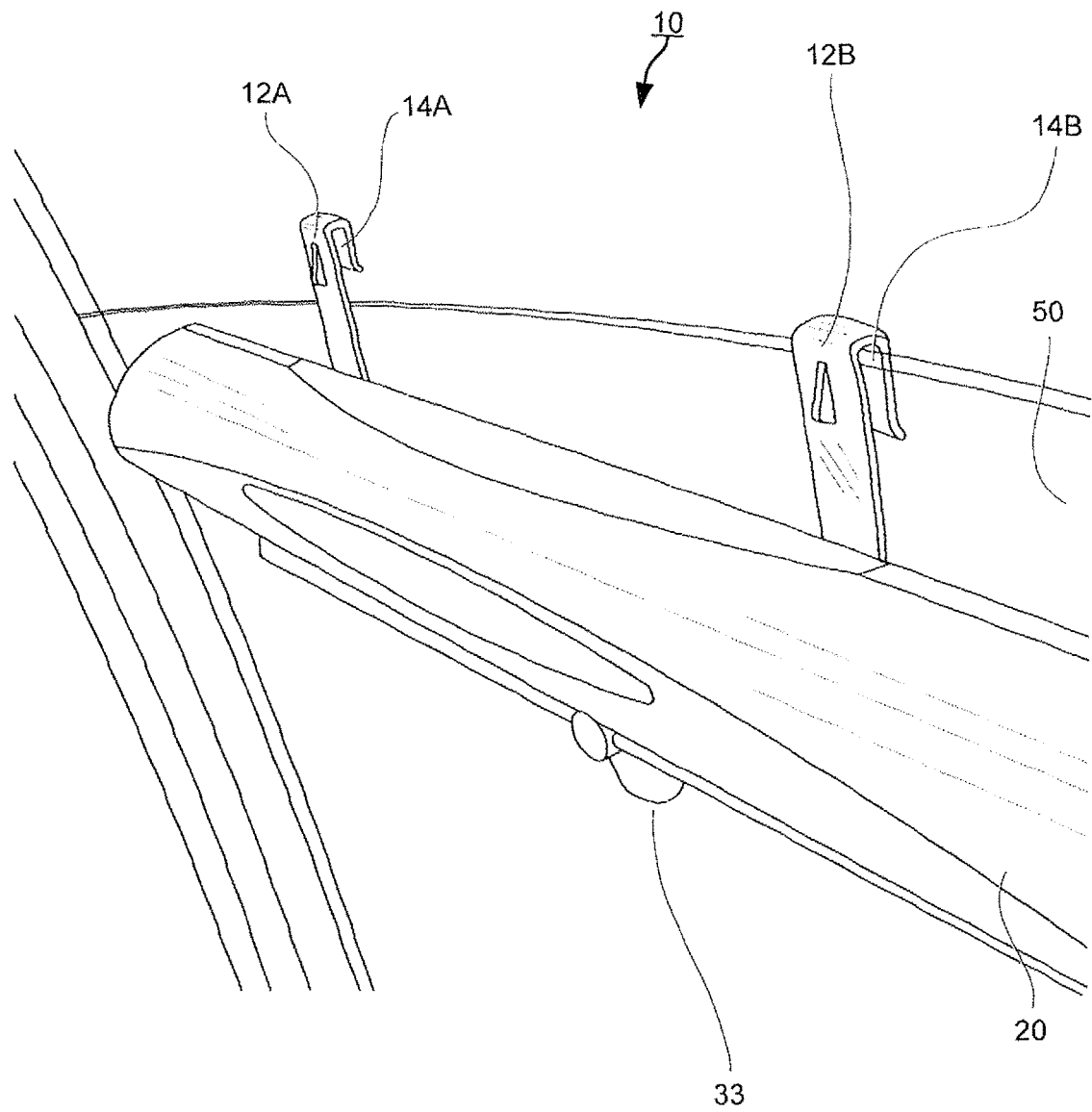
FIGS. 4A-4B are side plan views showing the top clips of FIG. 2 engaging the top of a vehicle window.
Figure 4B:
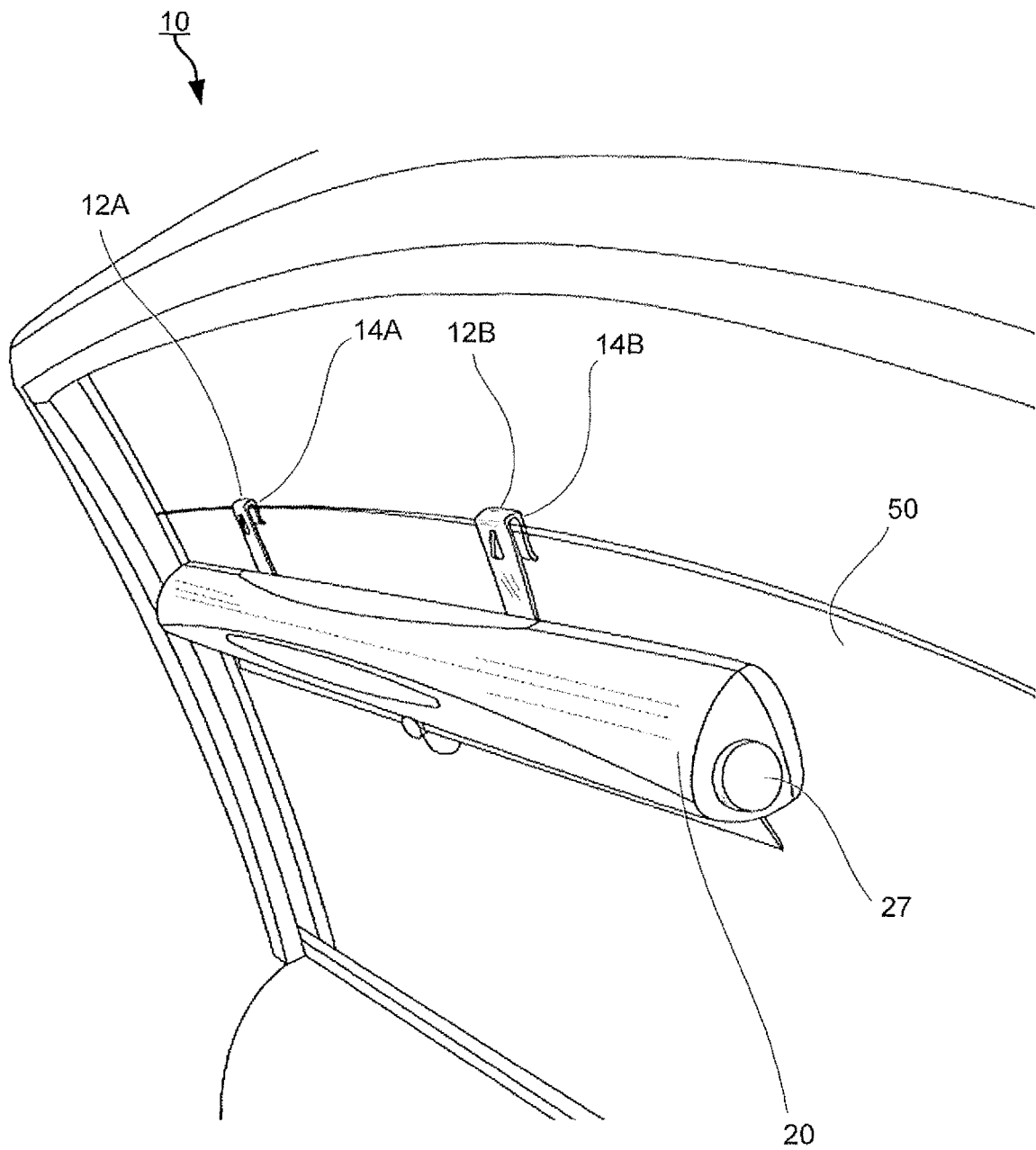
Figure 4C:
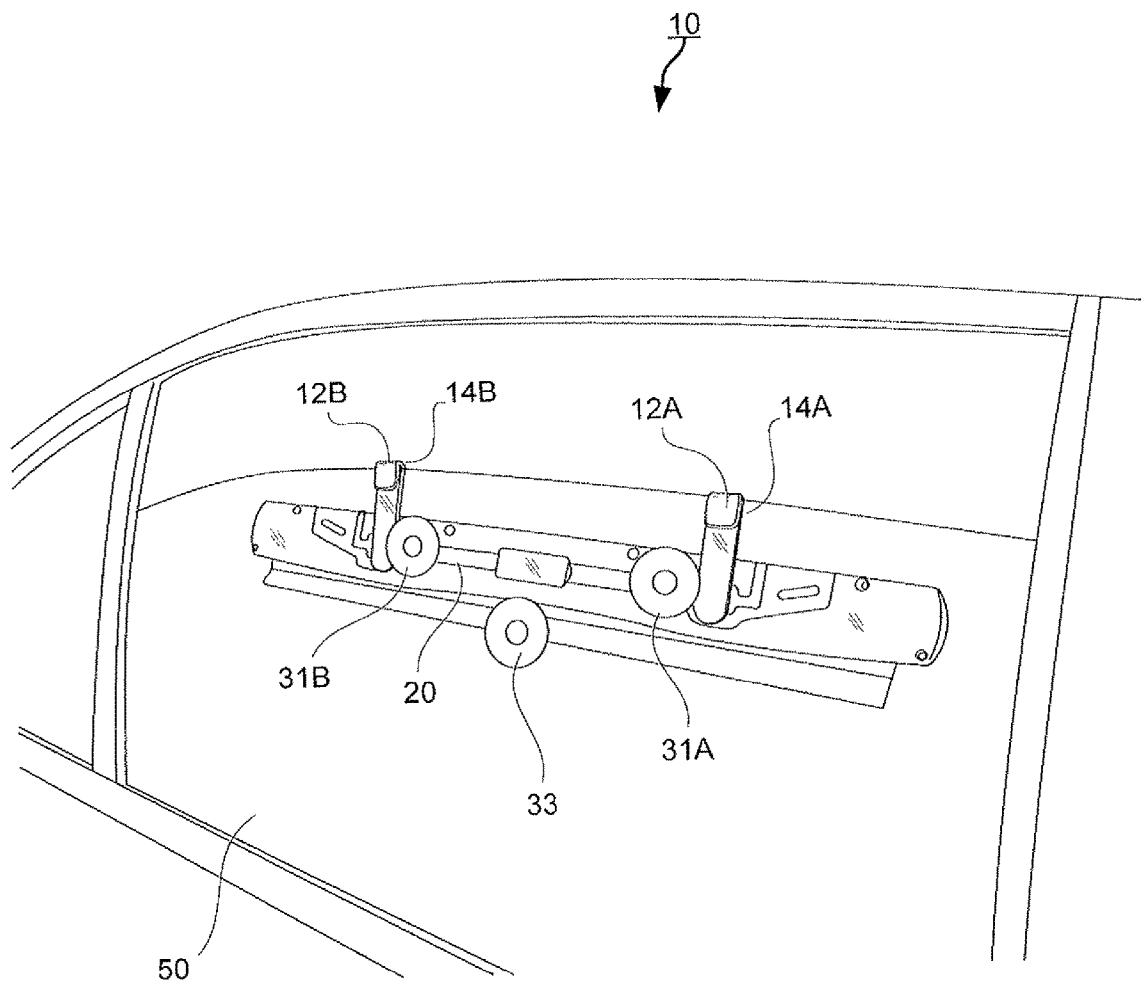
FIG. 4C is a rear side plan view showing the top clips of FIG. 2 engaging the top of a vehicle window.

The top clips (12A, 12B) may be made of plastic, rubber, another polymeric material, or other suitable material sufficiently pliable about a curved joint (13A, 13B) to allow each top clip (12A, 12B) to be in a closed position at rest, as shown, but can be opened by pulling the top clips (12A, 12B) outwardly to create a gap (14A, 14B) therein to grip onto an object, such as a vehicle window (50) as shown in FIGS. 4A-4C. That is, the hooks (17A, 17B) of the top clips (12A, 12B) can be opened, therefore, to fit over a top edge of a vehicle window (50) (FIG. 3D), thereby attaching the screen (25) of the window shade (10) to the vehicle window (50).

As shown in FIG. 2, the window shade (10) includes not only a top clip (12) for hanging a window shade onto the top edge of a vehicle window (50) as shown in FIGS. 4A-4C, but the window shade (10) also provides entirely new ways to attach the base (20) of the window shade (10) to the window (50).

FIGS. 2 and 4C show in one embodiment, the window shade (10) including suction cups (31A, 31B) extending outwardly from the base (20) of the window shade and adapted to connect the base (20) of the shade (10) to the vehicle window (50). In other words, the window shade (10) includes the suction cups (31A, 31B) to support the weight of the overall window shade (10) and removably retaining the window shade (10) in place. In this embodiment shown in FIGS. 4A-4C, the window shade (10) is held in place via the top clips (12A, 12B) hanging from the top of the vehicle window (50) and the suction cups (31A, 31B) fitting onto the vehicle window (50) to attach the shade (10), in a releasable fashion, to the vehicle window (50).

FIGS. 3A-3C illustrate the base (20) of the window shade (10) defines a "stair step" style of track (26A, 26B) in which the projecting axle (19A, 19B) of the top clips (12A, 12B) fits within and translates within the tracks (26A, 26B). The position of the top clips (12A, 12B) of the projecting axle (19A, 19B) may be located at various positions within the track (26, 26B) at the option of a user. In one embodiment, the top clips (12A, 12B) have a projecting axle (19A, 19B) with a button (16) disposed at the end to hold the projecting axle (19A, 19B) in the track (26A, 26B) on an opposite inner side of the side edge (120) of the base (20). The projecting axle (19A, 19B) fits within the track (26A, 26B) to an extent that allows the user to slide the axles (19A, 19B) to different points along the track (26A, 26B). The button (16) is positioned inside of the base (20) and acts to retain the projecting axles (19A, 19B) within the tracks (26A, 26B) during translation of the projecting axle (19A, 19B) of the clips (12A, 12B).

The button (16) or other attachment mechanism (16) disposed terminates the projecting axle (19A, 19B) on an inner side edge (120) of the base (20), opposite the top clips (12A, 12B), and secures the top clips (12A, 12B) to the track (26A, 26B) during operation and use of the shade (10) such as shown in FIG. 5. The user, therefore, can move the top clips (12A, 12B) to different positions within the track (26A, 26B) so that the top clips extend to a selectable height from the base (20). The base (20) defines not only the tracks (26A, 26B), but also detents (26C), or as shown, upright nodules (24A, 24B) extending from the track for securing the projecting axle (19A, 19B) of each clips (12A, 12B) at preferred heights for within the tracks (26A, 26B). The detents (26C) may appear as recessed detents (26C) or as protrusions disposed along the track (26A, 26B) that interfere with the smooth translation of the projecting axle (19A, 19B) along the track (26A, 26B).

FIGS. 3A-3C also illustrates that the top clips (12A, 12B) are attached to the base (20) via pivot points (40) at pivot axis (40A, 40B) for folding the top clips (12A, 12B) in a swiveling fashion from a vertical position (as shown in FIG. 4) to a horizontal position (as shown in FIG. 2) against the base (20) for storage. In the horizontal position (as shown in FIG. 2), an axial length of the clips (12A, 12B) is pivoted into a position in which the axial lengths of the clips (12A, 12B) are position substantially in alignment with a longitudinal axis of the base (20). In the vertical position (as shown in FIGS. 4A-4C), axial length of the clips (12A, 12B) are pivoted out of alignment with the axis of the base (20) such that the axial lengths of the clips (12A, 12B) are position substantially perpendicular to the longitudinal axis of the base (20) as well as being substantially aligned perpendicular to the edge of a vehicle window onto which it is secured.

As shown in FIG. 5, the top clips (12A, 12B) hold the window shade (10) in place at an upper end allowing the screen (25) to uncoil, or extend from, the coil reel (18) in the base (20) when pulled downwardly in an extended fashion. A bottom mount, such as a bottom suction cup (31) stabilizes the lower portion of the extended screen (25) against the window (50) so that the shade (10) is secured during use. It is to be understood that one of more bottom suction cups may be used in accordance with this subject disclosure.

FIG. 6 shows an exploded version of the base (20) that can be used in conjunction with the screen (25). The base (20) may be manufactured as two parts (20A, 20B) that houses the reel (18) about which the screen (25) rolls and extends. One of the base portions (20B) defines the stair step style of track (26A, 26B) in which an axle (16) of the top clips (12A, 12B) extend from one side of the top clips (12A, 12B) to the respective terminating closing buttons (19A, 19B) that hold the axle (19A, 19B) of the clips (12A, 12B) in the track (26A, 26B). a rigid element (44) is disposed at the end of the screen (25) adapted to maintain a substantially straight edge. Various fasteners (43) are provided throughout the window shade (10) to secure the various component parts together.

A ratcheting assembly (27, 28, 29) allows the screen (25) to be extended and temporarily locked in a predetermined extended position. A cap (30) closes an end of the reel (18) opposite the ratchet. The ratchet assembly has a button (27) that can be depressed to activate the ratchet assembly (27, 28, 29) and cause the screen (25) to coil within the base (20) housing. A pair of name plates (23, 29) is optionally included on one side of the base (20) for advertising or trademarks.

Figure 7A:
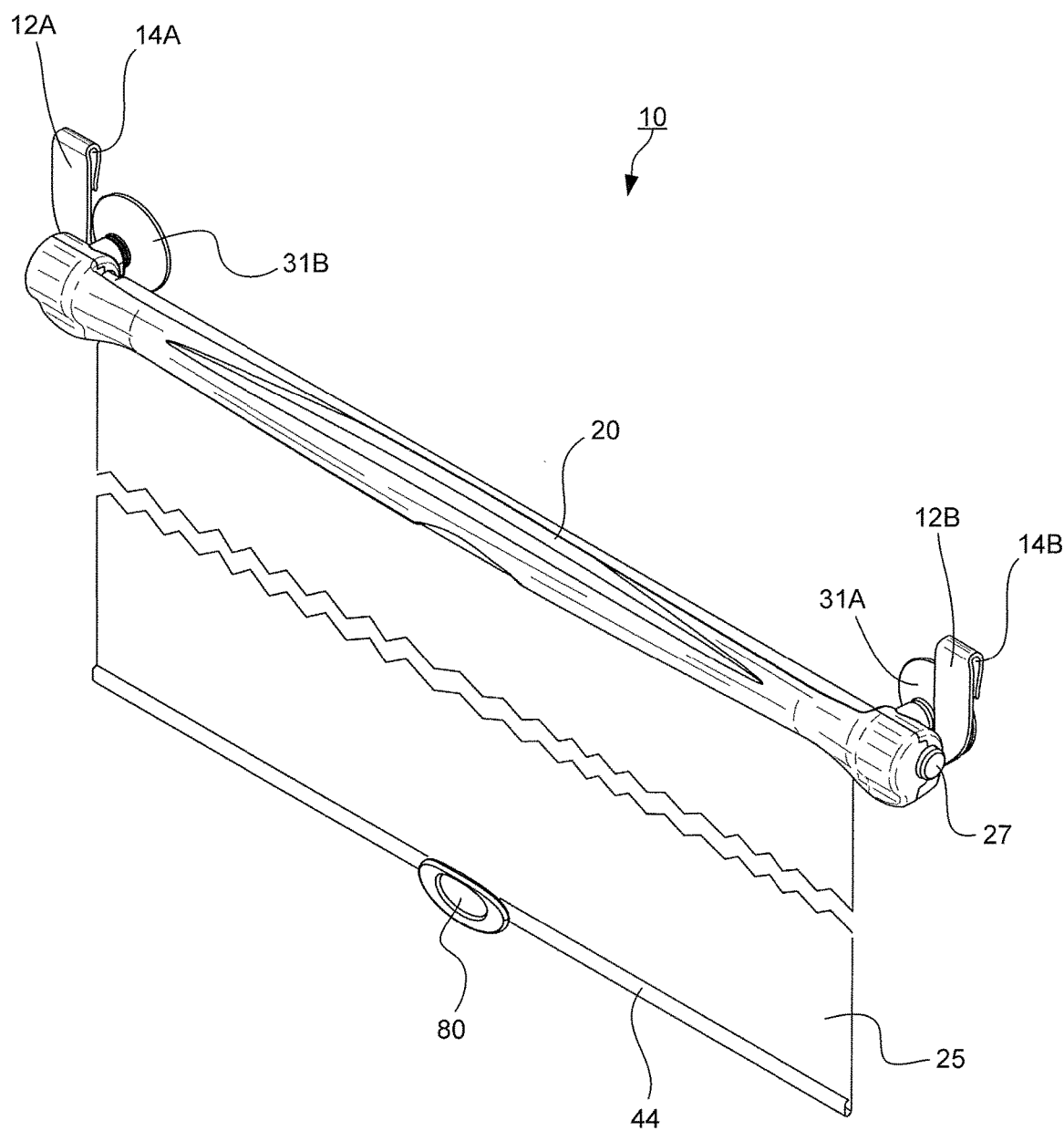
FIGS. 7A-7C illustrate another exemplary embodiment of the window shade including a temperature indicator attached to the screen.
Figure 7B:
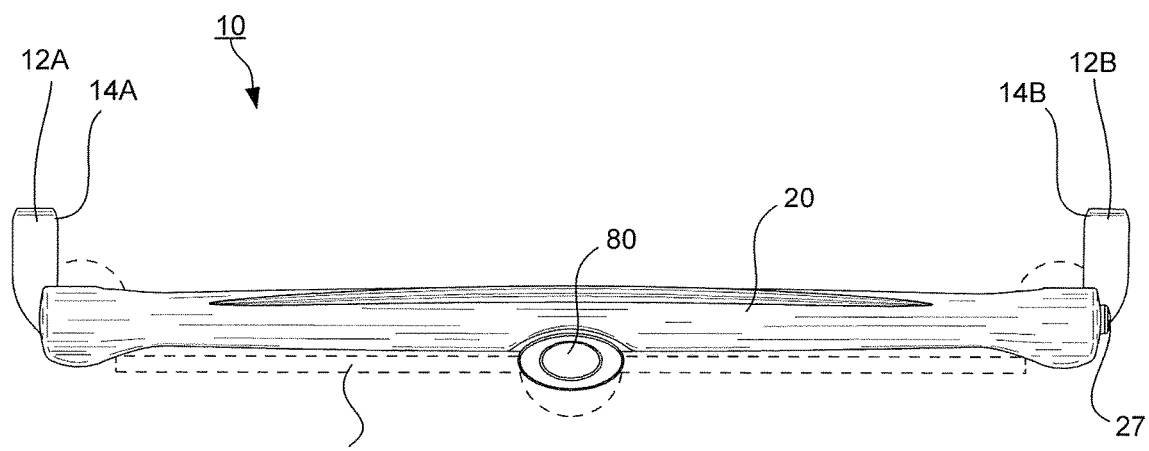
Figure 7C:
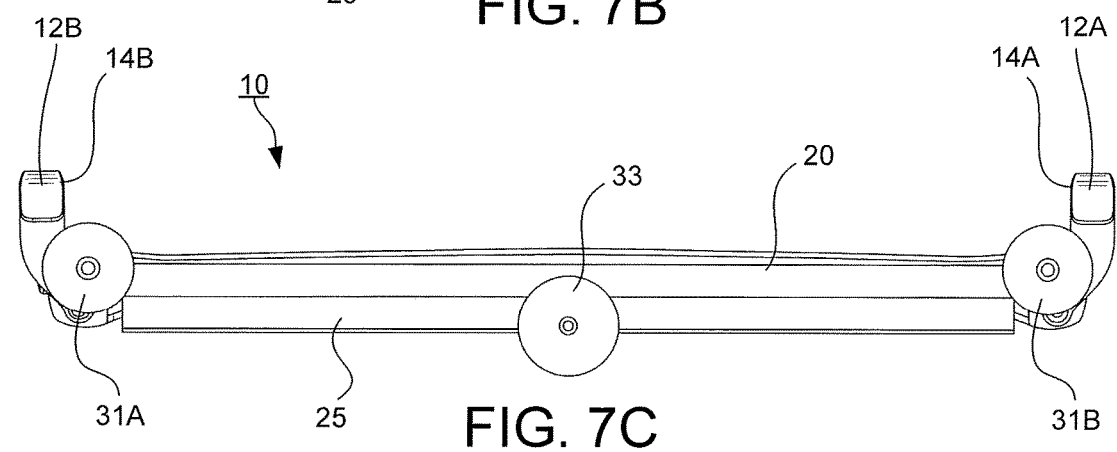

FIGS. 7A-7C illustrates another exemplary embodiment of the window shade (10) in which the adjustable pivoting clips (12A, 12B) are provided at the peripheral ends of the shade (10). As shown, the window shade (10) includes a temperature indicator (80). Although shown at the lower end of the shade (10), the temperature indicator (80) can be disposed at various locations on the shade (10). A fastening device, such as a lower, bottom or second suction cup (31) may also be located adjacent to, integrated as part of, or connected to the temperature indicator (80).

The temperature indicator (80) can be configured in a variety of ways, e.g., using thermochromatic ink configured to changed colors and/or opacity in response to temperature change. For example, the ink may turn from opaque to clear, or from one color to another (e.g., from blue to white), or vice versa in response to increases in temperature above one or more thresholds, or likewise in response to decreases in temperature below one or more thresholds. The temperature indicator (80) may also be configured as liquid crystal polymers or thermocouples or thermistors and electronic displays.

The temperature indicator (80) may have a variety of appearances for providing visible indications of temperature. For example, possible appearances include incremental numbers, a single color such as the temperature indicator (80) configured to change e.g., from white to red when the temperature exceeds a threshold, a bar graph such that may provide incremental or continuous temperature indicia, a thermometer bulb, or various other configurations.

The figures and the above noted description set forth a vehicle window shade that is installable in a secure manner against a vehicle window. The window shade is characterized in part by a stair step style of track in which top clips can slide to numerous positions so that the base of the screen fits windows of varying heights.

What is claimed:

1. A window shade comprising:
   a base having a longitudinal axis and a position recess;
   a retractable screen coiled and housed within the base;
   at least one track disposed in the base and positioned along the base longitudinal axis; and
   at least one clip, having a longitudinal axis and one end portion pivotally and slideably connected to the track within the base, that secures the shade to an object, and a second end portion having a boss that fits into the position recess, such that the clip longitudinal axis can be oriented to sit substantially aligned with the base longitudinal axis when in a closed position.

2. The window shade recited in claim 1, wherein the clip has a hook wherein the hook is biased closed.

3. The window shade recited in claim 1, wherein the clip is attached to the base.

4. The window shade recited in claim 1, wherein the clip secures the base in a horizontal plane aligned with an upper or lower edge of a vehicle window.

5. The window shade recited in claim 1, wherein the clip pivots between an axial length position substantially aligned with the base, and the axial length position substantially aligned perpendicular to the edge of a vehicle window.

6. The window shade recited in claim 1, wherein a pivot axis of the clip has an axle that is adapted to translate within the track disposed in the base.

7. The window shade recited in claim 6, wherein at least one detent is provided in the track into which the axle can be secured to minimize translation of the axle while in operation.

8. The window shade recited in claim 1, further comprising at least one suction cup connected to the base and adapted to fasten the base of the shade to a flat surface.

9. The window shade recited in claim 1, further comprising a temperature indicator.

10. The window shade recited in claim 8, further comprising another suction cup attached to the retractable screen and adjacent to a temperature indicator.

11. A window shade comprising:
    a base having a longitudinal axis and a position recess;
    a retractable screen coiled and housed within the base; and
    at least one clip having a longitudinal axis and one end portion pivotally connected to the base and disposed and slideable within a track positioned along the base longitudinal axis and a second end portion having a boss that fits into the position recess, wherein the clip longitudinal axis pivots between: substantially aligned with the base longitudinal axis, and substantially perpendicular to the base longitudinal axis.

12. The window shade recited in claim 11, wherein the clip has a hook wherein the hook is biased closed.

13. The window shade recited in claim 11, wherein the clip is attached to the base.

14. The window shade recited in claim 11, wherein a pivot axis of the clip has an axle that is adapted to translate within the track disposed in the base.

15. The window shade recited in claim 14, wherein at least one detent is provided in the track into which the axle can be secured to minimize translation of the axle while in operation.

16. The window shade recited in claim 11, further comprising at least one suction cup connected to the base and adapted to fasten the base of the shade to a flat surface.

17. The window shade recited in claim 11, further comprising a temperature indicator.

18. The window shade recited in claim 16, further comprising another suction cup attached to the retractable screen and positioned adjacent to a temperature indicator.

19. A window shade comprising:
    a base having a longitudinal axis and a position recess;
    a screen coiled and housed within the base adapted to be extended outside of the base and retracted;
    at least one track disposed in the base and positioned along the base longitudinal axis;
    at least one clip, having a longitudinal axis and one end portion pivotally and slideably connected to the track within the base and a second end portion having a boss that fits into the position recess, such that in a closed position, the clip longitudinal axis is oriented to sit substantially aligned with the base longitudinal axis;

wherein the clip secures an elongated housing of the base in a substantially horizontal plane aligned with an upper or lower edge of a vehicle window;

a temperature indicator connected to the shade; and an attachment device adapted to secure the screen to a flat surface in an extended position.

20. The window shade recited in claim 19, wherein a pivot axis of the clip has an axle adapted to translate within the track provided within the base, until the pivot axis is positioned within at least one detent in the track into which the axle can be secured to prevent translation of the axle while in operation.

\* \* \* \* \*